United States Patent [19] [11] 4,251,410
Danner et al. [45] Feb. 17, 1981

[54] REACTION PRODUCTS OF A POLYACRYLAMIDE FORMALDEHYDE, A SECONDARY AMINE AND AN–NH GROUP-CONTAINING FUNCTIONAL DERIVATIVE OF AN ACID

[75] Inventors: Bernard Danner, Riedisheim, France; Hans Gerber, Allschwil, Switzerland; Helmut Pummer, Forchtenstein, Australia

[73] Assignee: Sandoz Ltd., Basel, Switzerland

[21] Appl. No.: 963,634

[22] Filed: Nov. 24, 1978

Related U.S. Application Data

[63] Continuation-in-part of Ser. No. 832,203, Sep. 12, 1977, abandoned, which is a continuation-in-part of Ser. No. 801,021, May 26, 1977, abandoned.

[30] Foreign Application Priority Data

May 26, 1976 [CH] Switzerland .................... 6648/76
Feb. 25, 1977 [CH] Switzerland .................... 2377/77
Oct. 19, 1978 [CH] Switzerland .................... 10817/78

[51] Int. Cl.$^3$ .................. C08F 8/28; C08L 61/02; C08L 61/20
[52] U.S. Cl. .................. 260/29.40 A; 525/157; 525/158; 525/160; 525/161; 525/162; 525/163; 525/164; 525/336; 525/375; 525/379; 525/380; 162/168 NA
[58] Field of Search .............. 260/29.40 A, 29.4 R, 260/851; 526/23, 50, 52.2, 52.3; 525/336, 375, 379, 380, 157, 158, 160–164

[56] References Cited

U.S. PATENT DOCUMENTS

| | | | |
|---|---|---|---|
| 2,328,901 | 9/1943 | Grimm et al. ................ | 528/246 |
| 2,497,074 | 2/1950 | Dudley et al. ................ | 260/29.4 R |
| 2,605,253 | 7/1952 | Auten ......................... | 260/29.4 R |
| 2,862,901 | 12/1958 | Sven ........................... | 260/29.4 R |
| 2,918,386 | 12/1959 | Wooding ..................... | 428/485 |
| 3,323,979 | 6/1979 | Foster et al. ................ | 526/303 |
| 3,509,021 | 4/1970 | Westward ................... | 260/29.4 R |
| 3,790,529 | 2/1974 | Fujimura et al. ............ | 260/29.40 A |
| 3,859,212 | 1/1975 | Smalley et al. ............. | 526/303 |
| 3,907,758 | 9/1975 | Sackmann et al. .......... | 526/923 |
| 3,988,277 | 10/1976 | Witschonke et al. ....... | 260/29.6 CM |

FOREIGN PATENT DOCUMENTS 1243646 7/1967 Fed. Rep. of Germany.

OTHER PUBLICATIONS

Indust. & Eng. Chem., vol. 48 #12, pp. 2132–2137.
Chem. Abs. 81, 4379(a) 1974.
JACS, 66, pp. 222–225.

*Primary Examiner*—Joseph L. Schofer
*Assistant Examiner*—Herbert J. Lilling
*Attorney, Agent, or Firm*—Gerald D. Sharkin; Richard E. Vila; Thomas C. Doyle

[57] ABSTRACT

The reaction between (a) a polymerisate of acrylamide and/or methacrylamide and optionally of one or more further types of polymerizable ethylenic-unsaturated monomers, (b) formaldehyde, (c) a secondary amine and (d) a functional derivative of an acid having stabilizing properties against further polymerization of (a) and containing in the functional radical at least one NH group capable of entering into equilibrium reaction with formaldehyde under the reaction conditions used, e.g. urea, under neutral or basic conditions and in certain molar ratios, produces products, which in free base, acid addition salt or quaternary ammonium salt form are useful as flocculation agents, and particularly as retention aids for paper manufacture.

41 Claims, No Drawings

REACTION PRODUCTS OF A POLYACRYLAMIDE FORMALDEHYDE, A SECONDARY AMINE AND AN-NH GROUP-CONTAINING FUNCTIONAL DERIVATIVE OF AN ACID

This application is a continuation-in-part of our copending application Ser. No. 832,203, filed Sept. 12, 1977 now abandoned, which is itself a continuation-in-part of application Ser. No. 801,021, filed May 26, 1977, now abandoned.

The invention relates to polyamideamines and their use as flocculation agents.

According to the present invention there are provided the products of the reaction between:

(a) a polymerisate of acrylamide and/or methacrylamide and optionally of one or more further types of polymerisable ethylenic-unsaturated monomers, the acrylamide and/or methacrylamide monomers constituting at least 5 molar percent of any prepolymerisation mixture of such monomers and further types of ethylenic-unsaturated monomers, (b) formaldehyde, (c) a secondary amine of formula I, $$HN\begin{array}{c}R_1\\R_2\end{array} \qquad I$$

wherein each of $R_1$ and $R_2$, independently, is $(C_{1-6})$ alkyl, $(C_{3-6})$ alkenyl, $(C_{2-4})$ hydroxyalkyl or cyclohexyl, or $R_1$ and $R_2$ together constitute 1,5-pentamethylene, 1,4-tetramethylene, or 1,4-tetramethylene interrupted by O, S or $N$-$(C_{1-4})$ alkyl, and (d) a functional derivative of an acid having stabilizing properties against further crosslinking and/or polymerisation of the reaction product and containing in the functional radical at least one NH group capable of entering into equilibrium reaction with formaldehyde under the reaction conditions used, under neutral or basic conditions and in the molar ratio of reagents (b):(c):(d) per mol of carbamoyl group in reagent (a) of x:y:z, wherein y is 0.1 to 3, x is 0.1 to (y+1), and z is greater than zero, which end reaction products are in free base, acid addition salt form or quaternary ammonium salt form.

Preferred further types of polymerisable ethylenic-unsaturated monomers are ethylene, propylene, butylene, isobutylene, styrene, acrylonitrile, methacrylonitrile, acrylic acid, methacrylic acid, maleic acid, crotonic acid, vinyl ethers, e.g. the methyl and ethyl ethers, and protonatable or quaternisable, or protonated or quaternised ethylenic-unsaturated monomers which, in basic form, contain one or more tertiary amino groups, especially of the following types (A), (B) and (C):

(A) $(C_{2-4})$ Alkenyl-substituted pyridines further unsubstituted or substituted on the heterocyclic ring with a $(C_{1-2})$ alkyl radical or with a methyl radical and a $(C_{1-2})$ alkyl radical, in free base, acid addition salt or quaternary ammonium salt form, (B) Compounds of formula B, $$A_1-\underset{\underset{CH_2}{\|}}{C}-CO-NH-Alkylene-N\begin{array}{c}A_2\\A_3\end{array} \qquad B$$

wherein $A_1$ is hydrogen or methyl, $A_2$ is $(C_{1-6})$ alkyl or cyclohexyl, $A_3$ is $(C_{1-6})$ alkyl, and Alkylene is straight or branched chain $(C_{2-4})$ alkylene, in free base, acid addition salt or quaternary ammonium salt form, and (C) Compounds of formula $C^1$ or $C^2$, $$\begin{array}{c}CH_2=CHCH_2\\CH_2=CHCH_2\end{array}\!\!\!N-A_4 \qquad C^1$$

$$\begin{array}{c}CH_2=CHCH_2\\CH_2=CHCH_2\end{array}\!\!\!\overset{\oplus}{N}\!\!\!\begin{array}{c}A_4\\A_5\end{array}\quad A^\ominus \qquad C^2$$

wherein $A_4$ is $(C_{1-6})$ alkyl, and $A_5$ is $(C_{1-6})$ alkyl, or, for formula $C^2$, $A_4$ and $A_5$, alternatively, together constitute 1,4-tetramethylene or 1,5-pentamethylene, and $A^\ominus$ is an anion, the compounds of formula $C^1$ being in free base or acid addition salt form.

Of the above preferred ethylenic-unsaturated monomers, the protonatable or quaternisable, or protonated or quaternised monomers which, in basic form, contain one or more tertiary amino groups are especially preferred, and of the latter, those of the types (A), (B) and (C) are most preferred.

In the monomers of type (A), the alkenyl radical is preferably vinyl and, independently, the pyridine ring is preferably unsubstituted or substituted with a single methyl radical. The most preferred such compounds are 2-vinylpyridine, 4-vinylpyridine and 5-vinyl-2-picoline.

In the compounds of formula B, each of $A_2$ and $A_3$, independently, is preferably methyl or ethyl, and Alkylene is preferably ethylene, 1,2-propylene or 1,3-propylene, of which the latter is most preferred.

The preferred acids of the acid addition salt forms of the compounds of types (A) and (B) are formic, acetic, hydrochloric, sulphuric and carbonic acids. Preferably the quaternary ammonium salt forms of the compounds of types (A) and (B) are formed by N-alkylation with a $(C_{1-6})$ alkyl alkylating agent, more preferably a methylating or ethylating agent.

In the compounds of formula $C^1$, $A_4$ is preferably methyl or ethyl, and in those of formula $C^2$, each of $A_4$ and $A_5$, independently, is preferably methyl or ethyl. The anion $A^\ominus$ may be any conventional anion of a quaternary ammonium salt but is preferably chloride. The preferred acids of the acid addition salt forms of the compounds of formula $C^1$ are formic, acetic, hydrochloric, sulphuric and carbonic acids.

Many of the substituted pyridines of type (A) are known and can be produced by known methods e.g. as described in "Functional Monomers—their Preparation, Polymerisation and Application", Volumes 1 and 2, 1973/1974, edited by R. H. Yocum and G. B. Nyquist, New York Dekker. Those not previously known are obtainable in conventional manner from available starting materials.

Similarly the compounds of formula B and $C^1$ are either known or producible by known methods from available starting materials.

The compounds of formula $C^2$ may be produced in conventional manner from available starting materials, e.g. by introduction of 2 allyl radicals in a secondary amine $A_4$—NH—$A_5$, or, alternatively, by quaternisation of the corresponding compounds of formula $C^1$, when $A_4$ and $A_5$ do not together consitute 1,4-tetramethylene or 1,5-pentamethylene.

Preferably the molar percent of acrylamide and/or methacrylamide monomers in a mixture of acrylamide and/or methacrylamide monomers with one or more further types of polymerisable ethylenic-unsaturated monomers, which must be at least 5 molar percent, is at least 50 molar percent, or more preferably, at least 70 molar percent.

The polymerisates (a) may be produced from the above indicated monomeric precursors in conventional manner, e.g. by heating the monomers in aqueous medium to slightly elevated temperatures, e.g. 30° to 80° C., or more preferably, 35° to 40° C., advantageously in the presence of a suitable polymerisation initiator, until the desired degree of polymerisation or desired average molecular weight has been attained, as indicated by viscosity measurements. The obtained polymerisate containing carbamoyl groups is advantageously reacted further with the reagents (b), (c) and (d) to produce the reaction products of the present invention without first being isolated from the aqueous medium in which it has been produced.

If desired the polymerisation may be effected in the presence of a copolymerisable cross-linking agent, especially when the polymerisation would otherwise lead to a polymerisate with a relatively and undesirably low average molecular weight, e.g. less than 500,000. Suitable agents are those with at least two, preferably two or three, unsaturated ethylenic groups per molecule, e.g. triallyl cyanurate, divinylbenzene, methylene-bis-acrylamide and methylene-bis-methacrylamide, of which the latter two are especially preferred. It is to be understood that such cross-linking agents containing at least two unsaturated ethylenic groups per molecule are included amongst the further types of ethylenic-unsaturated monomers mentioned as components of the pre-polymerisation mixture for the polymerisate (a). The percentage by weight of polymerisable cross-linking agent used is preferably 0.01 to 5, and more preferably, 0.05 to 2, based on the total weight of monomers present.

Preferred are polymerisates (a) which possess a water-solubility at room temperature of at least 1%, more preferably 1–25%, and most preferably 1.5 to 5%. Of the possible types of polymerisates (a), homopolymerisates or copolymerisates from acrylamide and/or methacrylamide and copolymerisates from acrylamide and/or methacrylamide and the optionally protonated or quaternised monomers of types (A), (B) and/or (C) are preferred. Preferably the polymeric chains formed are derived from 7,000 to 140,000, more preferably 14,000 to 70,000, and most preferably 20,000 to 40,000 monomeric units and have average molecular weights in the range of 500,000 to 10,000,000, more preferably 1,000,000 to 5,000,000, and most preferably 1,500,000 to 3,000,000. When the copolymerisates are derived in part from the optionally protonated or quaternised monomers, especially those of the types (A), (B) and/or (C), such starting monomers preferably constitute between 10 and 30 molar percent of the mixture with acrylamide and/or methacrylamide to be copolymerised.

The formaldehyde as reagent (b) may be generated in situ e.g. from a polymeric form of formaldehyde, such as paraformaldehyde, or a methylol compound. Alternatively it may be used in the reaction in aqueous solution. Preferably the formaldehyde is introduced into the reaction vessel in aqueous solution, a technical grade aqueous formaldehyde solution conveniently being used.

In the compounds of formula I used as reagent (c), it will be appreciated that the molecules should not contain groups or combinations of groups which are known to cause stability and/or steric problems. Thus, for example, $R_1$ or $R_2$ cannot signify α-hydroxy-$(C_{2-4})$ alkyl. Each of $R_1$ and $R_2$, independently, when signifying alkyl, is straight or branched chain alkyl and preferably contains 1 to 4 carbon atoms, and more preferably is methyl or ethyl. When either of $R_1$ and $R_2$ signifies alkenyl, this preferably contains 3 or 4 carbon atoms, more preferably 3. The preferred alkenyl radicals are 2- or 3-butenyl and allyl, of which the latter is most preferred. In any hydroxyalkyl radical signified by $R_1$ or $R_2$, the hydroxyl group is preferably in either the β- or the ω-position. The preferred hydroxyalkyl radicals are 2-hydroxyethyl and 2-hydroxypropyl, of which the former is more preferred.

When $R_1$ and $R_2$ together constitute 1,4-tetramethylene interrupted by O, S or N-$(C_{1-4})$ alkyl, the preferred compounds of formula I are pyrrolidine, piperidine, morpholine, thiomorpholine and N-methylpiperazine, of which pyrrolidine, piperidine, morpholine and N-methylpiperidine are more preferred, the latter three even more preferred, and morpholine is the most preferred.

Thus preferred compounds of formula I are those of formula I',

wherein each of $R_1'$ and $R_2'$, independently, is $(C_{1-2})$ alkyl, allyl, 2-hydroxyethyl or cyclohexyl, preferably methyl, ethyl or 2-hydroxyethyl, or $R_1'$ and $R_2'$, together with the attached HN<group, constitute morpholine, pyrrolidine, piperidine or N-methylpiperazine, preferably morpholine.

The most preferred specific compounds of formula I for use in the process for producing the products of the present invention are N-methyl-ethanolamine, diethanolamine and morpholine.

The reagents (d) feature at least one NH group capable of entering into equilibrium reaction with formaldehyde, according to the following reaction scheme,

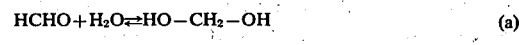

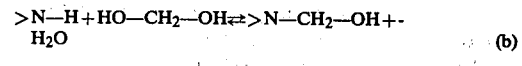

under the reaction conditions used and whereby the equilibrium of (b) is shifted strongly to the right when basic conditions are used.

The preferred reagents (d) are those which contain, apart from one or more functional derivatives of an acid group containing one or more NH groups, no further substituents which react with formaldehyde, secondary amines and carbamoyl group-containing polymerisates to give undesired side reactions. More especially, such reagents contain one or more functional derivatives of an acid group and no further substituents of strong functionality, and preferably are non-polymeric.

Preferred functional derivatives of acid groups in the reagents (d) are the following:

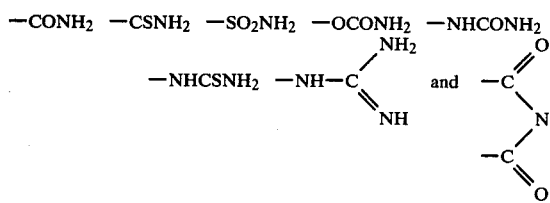

Preferred reagents (d) are the compounds of formulae II, III, IV and V,

   II wherein $R_6$ is hydrogen or $(C_{1-6})$ alkyl, and $X_1$ is —$CONH_2$, —$CSNH_2$, —$NHCONH_2$, —$NHCSNH_2$

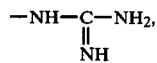

the compounds wherein $X_1$ is

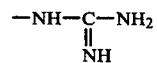

being in free base or acid addition salt form,

   III wherein $R_7$ is $(C_{1-6})$ alkyl, phenyl or methylphenyl, and $X_2$ is —$SO_2NH_2$ or —$OCONH_2$,

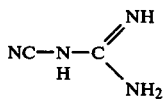   IV

   V wherein each of $R_8$ and $R_9$ is —$NH_2$, or $R_8$ and $R_9$ together constitute a $(C_{2-4})$ alkylene or $(C_{2-4})$ alkylidene bridging group or a phenylene-1,2 group.

Preferred acids in the acid addition salt forms of the compounds of formula II wherein $X_1$ is

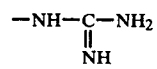

are formic, acetic, hydrochloric, sulphuric and carbonic acids.

Particularly preferred reagents (d) are urea, N-monosubstituted ureas, thiourea, guanidine and guanidyl compounds of which the latter three are preferred, more especially thiourea and the compounds of formula VI,

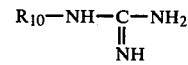   VI wherein $R_{10}$ is hydrogen, $(C_{1-6})$ alkyl or —CN.

Even more preferred reagents (d) are thiourea, guanidine and dicyandiamide, of which dicyandimide is the most preferred reagent (d).

The present invention further provides a process for producing a polyamideamine in free base, acid addition salt or quaternary ammonium salt form comprising reacting together the reagents (a), (b), (c) and (d), as hereinbefore defined, under the conditions and in the molar ratio as hereinbefore defined and, when required, interconverting free base and acid addition salt forms and/or quaternising the free base form of the polyamideamine to obtain the quaternary ammonium salt form thereof.

The number of hydrogen atoms bound to the nitrogen atoms per molecule of the reagent (d) which are capable of entering into equilibrium reaction with formaldehyde under the reaction conditions used, this number being hereinafter denoted n, is not necessarily identical with the total number of hydrogen atoms bound to nitrogen atoms in any such reagent (d), but varies according to the reaction conditions employed for effecting the reaction between the reagents (a), (b), (c) and (d). Thus for urea, n can be 1 to 4, for quanidine 1 to 3 and for dicyandiamide and thiourea, 1 to 2. The abilities of the hydrogen atoms bound to nitrogen atoms in the reagents (d) to enter into equilibrium reaction with formaldehyde is discussed in Chapter 14, pages 373–395 under the title "Formaldehyde" by J. Frederic Walker in J.A.C.S. Monograph Series No. 159, 3rd Edition, Reinhold Publishing Corporation.

Preferably the reagent (d) and the reaction conditions are so chosen that n is 1 to 4, more preferably 2 to 4 and most preferably 2.

With regard to the molar relationships between the amount of reagents (a), (b), (c) and (d) used, one set of preferred relationships applies when z, which is in all cases greater than zero, has a preferred value being equal to or greater than $[2x-(y+1)]/n$, when this value is a positive quantity. In this case x, which is 0.1 to $(y+1)$, is preferably $\leq 2y$ and more preferably y/2 to y. In abolute terms, x is preferably 0.1 to 2, more preferably 0.1 to 1, and most preferably 0.5 to 1. y, which is 0.1 to 3, is preferably 0.1 to 2 and more preferably 0.5 to 1.5. Compared with the values of x and y the value of z, so long as it is equal or greater than $[2x-(y+1)]/n$, when this is positive, is not so critical. It is preferably, however, at least 10% of x and, in absolute terms and more preferably, at least 0.5. There is no critical upper limit for z, but it is preferably no greater then 10, more preferably no greater than 4, and most preferably no greater than 2.

Another set of preferred relationships applies whether or not z has a value equal to or greater than $[2x-(y+1)]/n$, when this is a positive quantity. Here, y is 2 to 3, x is $(1\pm0.2)y$, z is 0.5 to 1.5 and n is 2 to 4. More preferably, however, z is equal to or greater than $[2x-(y+1)]/n$ when this has a value of at least 0.5.

Even more preferably, y is 2 to 2.5, especially 2, x is the same as y, especially 2, and z is 0.8 to 1.2, especially 1.

The process may conveniently be effected by simultaneously reacting the reagents (a), (b) (c) and (d) together, but alternatively can be effected in a stepwise manner. The simultaneous reaction is especially preferred when x is less than 2.

Preferably the reaction medium is aqueous and basic rather than neutral. The desired degree of basicity may be achieved on addition of the secondary amine of formula I, i.e. the reagent (c), to the reaction medium, and may independently be adjusted by addition of acid. Preferably the pH of the reaction medium is between 8 and 12, more preferably between 9 and 11.

The reaction may be conducted under mild temperature conditions, e.g. between room temperature and 90° C., and is preferably conducted between 20° and 65° C., more preferably between 30° and 60° C. When relatively low-boiling secondary amines of formula I are used as reagents (c), the reaction temperature is preferably appropriately low to avoid undue losses of the amine reagent due to evaporation.

Preferably the reagent (d) is present in the reaction mixture in such an amount or at such a concentration that no precipitation of the unreacted reagent or of a reaction product of this reagent with formaldehyde and optionally the other reagents (a) and (c) occurs in the aqueous reaction mixture at room temperature, since a product of preferred structural characteristics would be formed in solution and would be sufficiently water-soluble to remain in solution.

The reaction between reagents (a), (b), (c) and (d) is preferably allowed to continue from 1 to 6 hours and its duration depends naturally, amongst other factors, on the temperature and pH conditions employed. It is advantageous to add a conventional buffer or an acid to the aqueous reaction medium in such an amount to give a pH of 9 to 11, more preferably 9 to 10 after the desired reaction time in order to keep the pH constant. Suitable acids or salts for this purpose are weak acids or acid salts, respectively, especially potassium and sodium dihydrogen phosphate.

The amount of water of the aqueous medium in which the reaction is conveniently effected is preferably so chosen and maintained that the resulting aqueous solution or dispersion of the reaction product is suitable for direct industrial application without the need to concentrate it or separate the reaction product therefrom.

In the case where x is between 2 and 4 and n is at least 2, it is preferable to effect the reaction in a stepwise manner, by which the reagents (b), (c) and (d) are initially reacted together in a stepwise manner to form an isolable product, and the latter is subsequently reacted with reagent (a). The product of the reaction between the reagents (b), (c) and (d) is believed to have the formula VII,

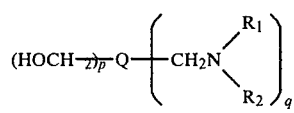

wherein
Q is a $n_1$-valent radical of the reagent (d),
$n_1$ is 2, 3 or 4,
p is 1 to $(n_1-1)$,
q is 1 to $(n_1-1)$, and
$p+q=n_1$.

Such compounds of formula VII are preferably produced either by reacting together the reagent (d) with formaldehyde (reagent (b)) and the secondary amine (reagent (c)) in a molar ratio 1:q to (p+q−1):q, respectively, and thereafter reacting the intermediate produced with a further amount of formaldehyde equivalent to (1 to p) times the molar amount of reagent (d) used, or by reacting together the reagent (d) with the equimolar reaction product of the secondary amine (reagent (c)) with formaldehyde (reagent (b)) in a molar ratio of 1:q, respectively, and thereafter reacting the intermediate produced with a further amount of formaldehyde equivalent to p times the molar amount of reagent (d) used. In the above, p is preferably 1 and q is preferably 1 to 3, especially 1.

The reaction between the secondary amine and formaldehyde is preferably effected at relatively low temperatures, preferably between 0° and 60°, and more preferably at room temperature, and the reaction between the resulting methylolated amine and the reagent (d), and that between the resulting intermediate product and the further quantity of formaldehyde are preferably effected at a temperature between room temperature and 90° C., more preferably between 60° and 70° C. and at a pH of between 8 and 12, more preferably between 9 and 11.

The product, of which the formula is believed to be formula VII as given above, may then be isolated by removal of the water of the reaction mixture by distillation at reduced pressure, or it can be reacted with the reagent (a) directly without prior isolation.

The reagent (a) is then reacted with the product of the reaction between reagents (b), (c) and (d), preferably in aqueous medium at a temperature between room temperature and 90° C., more preferably between 20° and 65° C., and preferably at a pH between 8 and 12, more preferably between 9 and 11.

The polyamideamine reaction products from the reagents (a), (b), (c) and (d) can be converted into their acid addition salt forms, when desired, in conventional manner, e.g. by salification with an appropriate acid. The conversion of acid addition salt forms to the corresponding free base forms may be effected in conventional manner, e.g. by basification. Similarly the quaternary ammonium salt forms of the polyamideamines can be produced, when desired, in conventional manner from the polyamideamines, e.g. with the use of such alkylating agents as alkyl halides hydroxyalkyl halides or alkenyl halides. The corresponding alkyl, hydroxyalkyl and alkenyl radicals preferably have 1 to 4, 2 to 4 and 3 or 4 carbon atoms, respectively and the preferred halides are chloride, bromide and iodide. Dialkyl sulphates are also preferred alkylating agents, especially those wherein the alkyl radicals have 1 to 4, more preferably 1 or 2 carbon atoms. The alkyl, hydroxyalkyl and alkenyl halides are however generally preferred as alkylating agents to the dialkyl sulphates.

Preferably, however, the polyamideamine reaction products of the present invention are neither in acid addition salt form nor in quaternary ammonium salt form.

The products of the present invention are useful as flocculation agents for aqueous colloidal solutions and aqueous suspensions. Accordingly the present invention further provides a method of flocculating an aqueous colloidal solution or an aqueous suspension characterised in that such flocculation is effected in the presence of a product of the reaction between the reagents (a), (b), (c) and (d), as defined hereinbefore, in free base, acid addition salt or quaternary ammonium salt form, as a flocculation agent.

By the term flocculation agent, as used herein, is to be understood not only an agent which has the effect of causing colloidal or suspended solid particles in a liquid medium to aggregate or agglomerate, but also a so-called "retention aid" for paper manufacture, which agent, in part by virtue of its activity as a flocculation agent, causes the various types of solid suspendate, particularly fillers, in the aqueous cellulose suspensions in paper manufacture to be retained in the finished paper product, thereby eliminating excessive losses of such suspendates in the backwater. Thus the products of the invention may be added to the paper stock with the object of eliminating excessive loss of the colloidal or suspended solid constituents on sieving.

The products of the present invention are especially valuable as retention aids in paper manufacture, and accordingly the present invention further provides a method of paper manufacture characterised in that there is used as a retention aid a product of the reaction between the reagents (a), (b), (c) and (d), as defined hereinbefore, in free base, acid addition salt or quaternary ammonium salt form. Preferably the method comprises adding the product of the invention to the paper stock.

Examples of fillers in paper manufacture which can be retained in the paper stock which is subsequently formed into sheets after sieving by the products of the present invention, are kaolin, calcium salts, e.g. calcium carbonate, and titanium dioxide. Other components of the paper stock which are also retained are sizing agents, optical brighteners, dyestuffs and aluminium sulphate.

The products of the present invention may preferably be added to the aqueous colloidal solution or aqueous suspension requiring flocculation, or, in the case of paper manufacture, requiring retention, in amounts within the range 0.001 to 100 mg/l, more preferably 0.005 to 50 mg/l, even more preferably 0.01 to 10 mg/l and most preferably 0.025 to 3 mg/l, based on the dry weights of the products added per liter of solution or suspension requiring flocculation or retention treatment.

The products of the invention, if they have been isolated from the reaction medium, are suitably dissolved in water before being added to the aqueous colloidal solution or suspension requiring flocculation treatment. Alternatively the reaction solution or dispersion itself may be added to the solution or suspension requiring treatment, optionally after addition of a dispersing agent to the reaction solution or dispersion. Such aqueous solution or dispersions of the products of the invention exhibit good storage properties, not only at room temperature but also at elevated temperatures, e.g. 50° C. The rate of increase in viscosity of an aqueous solution with time, which gives an indication of the storage stability, is found to be favourably low.

The present invention further provides aqueous solutions or dispersions of the products of the invention for use as flocculation agents, e.g. as retention aids.

Those products of the present invention which have been produced from secondary amines of formula I, as reagent (c), wherein each of $R_1$ and $R_2$ is $(C_{2-4})$hydroxyalkyl, or preferably 2-hydroxyethyl, are especially suitable for use with aluminium sulphate as flocculation agents, and more especially as retention aids for the production of paper containing fillers and other conventional paper additives.

In the following Examples, which illustrate the invention, the percentages are by weight and the temperatures are in degrees Centigrade. In the Application Examples, the parts are by weight.

PRODUCTION EXAMPLES

EXAMPLE 1

250 g of a 2.5% aqueous solution of polyacrylamide with a Brookfield viscosity of 4300 cp (spindle No. 4, 60 revs/min), 6.6 g of N-methyl-ethanolamine, 3.6 g of a 37% aqueous formaldehyde solution and 7.4 g of dicyandiamide are reacted at 40°–45° over a period of 4 hours. The pH of the reaction solution is then adjusted to 10 by addition of 4.3 ml of a 50% solution of sodium dihydrogen phosphate. The viscosity of the solution is 4600 cp, and after a storage time of 6 weeks at room temperature it is 5050 cp.

EXAMPLE 2

The procedure of Example 1 is repeated using 250 g of a 2.5% aqueous solution of polyacrylamide with a Brookfield viscosity of 3000 cp (spindle No. 4, 60 revs/min), 6.6 g of N-methyl-ethanolamine, 7.2 g of a 37% aqueous formaldehyde solution and 7.4 g of dicyandiamide. After reaction the pH of the reaction solution is adjusted to 9.5 by addition of 3.2 ml of a 50% solution of sodium dihydrogen phosphate. Immediately after the reaction the viscosity of the solution is 3600 cp. and after a storage time of 6 weeks at room temperature it is 3650 cp.

EXAMPLE 3

225 g of a 40% aqueous solution of monomethylurea, produced as described in Example 2 on page 348 of Methoden der organishcen Chemie, Vol. XIV/2, Makromolekulare Stoffe, 1963, Houben-Weyl, are reacted with 112.5 g of a 40% aqueous solution of dimethylamine at 40°–45° over a period of 4 hours. To the reaction mixture are then added dropwise 81 g of a 37% aqueous formaldehyde solution and the mixture is reacted at 70° over a period of 2 hours. Thereafter 2840 g of a 2.5% aqueous solution of polyacrylamide with a Brookfield viscosity of 3100 cp (spindle No. 4, 60 revs/min) are reacted with 419 g of the reaction mixture at 45° over a period of 4 hours. The cationic polyacrylamide solution obtained has a viscosity of 3300 cp and can be used directly as a floccuation agent.

After a storage time of 6 weeks at room temperature the viscosity remains 3300 cp.

EXAMPLE 4

250 g of a 2.5% aqueous solution of polyacrylamide with a Brookfield viscosity of 4300 cp (spindle No. 4, 60 revs/min), 6.6 g of N-methyl-ethanolamine, 7.2 g of a 37% aqueous formaldehyde solution and 6.7 g of thiourea are reacted at 40°–45° over a period of 4 hours. The pH of the reaction solution is then adjusted to 10 by addition of 0.3 ml of a 50% solution of sodium dihydrogen phosphate. The viscosity of the solution is 4700 cp and after a storage time of 3 weeks at room temperature it is 5050 cp, which remains almost unchanged for a further 3 weeks.

EXAMPLE 5

34 g of acrylamide and 19 g of diallyl dimethylammonium chloride are dissolved in 786 g of deionised water with agitation by means of a strong current of nitrogen. The agitation removes oxygen from the mixture. To the mixture is added a solution of 85 mg of ammonium persulphate in 4 g of water, and the whole is warmed to 37°. After 20 hours at this temperature the reaction solution is diluted by addition of 1017 g of water. The solution has a Brookfield viscosity of 2600 cp (spindle No. 4, 60 revs/min).

To the diluted polymer solution are added 40.2 g of dicyandiamide, 38.8 g of a 37% aqueous formaldehyde solution and 35.9 g of N-methyl-ethanolamine. The reaction, which is conducted at 45°, takes 4 hours. Thereafter, the pH of the reaction solution is adjusted to 9.5 by addition of 13.2 ml of a 50% solution of sodium dihydrogen phosphate. The viscosity of the reaction product is 3400 cp which remains practically unchanged after a storage time of 4 weeks at room temperature.

EXAMPLE 6

250 g of a 2.5% aqueous solution of polyacrylamide with a Brookfield viscosity of 3700 cp (spindle No. 4, 60 revs/min) are reacted with 7.2 g of a 37% aqueous formaldehyde solution and 9.3 g of diethanolamine in the presence of 11 g of dicyandiamide at 45° over a period of 4 hours. The pH of the reaction solution after reaction is 9.9 and the Brookfield viscosity 3700 cp. After a storage period of 6 weeks at room temperature, the solution has a viscosity of 5100 cp.

EXAMPLE 7

250 g of a 2.5% aqueous solution of polyacrylamide with a Brookfield viscosity of 3700 cp (spindle No. 4, 60 revs/min) are reacted with 7.2 g of a 37% aqueous formaldehyde solution and 6.6 g of a 60% aqueous dimethylamine solution in the presence of 11 g of dicyandiamide at 45° over a period of 4 hours. The pH of the reaction solution is then adjusted to 9.5 by addition of 3.24 g of a 50% aqueous solution of sodium dihydrogen phosphate. The polyamide amine solution then has a Brookfield viscosity of 4450 cp. After a storage time of 7 days at 50° the viscosity remains practically unchanged.

EXAMPLE 8

Example 1 is repeated using 250 g of a 2.5% aqueous solution of polyacrylamide with a Brookfield viscosity of 4400 cp (spindle No. 4, 60 revs/min), 6.6 g of N-methyl ethanolamine, 7.2 g of a 37% aqueous formaldehyde solution and 8.4 g of guanidine hydrochloride. Immediately after the reaction the viscosity of the solution is 5600 cp. After a storage time of 6 weeks at room temperature the viscosity is 5725 cp and the pH is 9.85.

EXAMPLE 9

81 g of a 37% aqueous formaldehyde solution are treated with 112.5 g of a 40% aqueous solution of dimethylamine with ice cooling. As soon as the exothermic reaction has ended 60 g of urea are added to the reaction mixture containing dimethylamino-methanol and the whole is heated to 70° over a period of 2 hours. Thereafter 81 g of a 37% aqueous formaldehyde solution is added dropwise to the reaction mixture and the reaction is continued at 70° for 2 hours. Then the water formed in the reaction is distilled off under a reduced pressure of 20 mm of mercury between 60° and 70°. Thereby 147 g of a urea-dimethylamine formaldehyde condensation product is formed.

3350 g of a 2% aqueous solution of polyacrylamide with a Brookfield viscosity of 3200 cp (spindle No. 4, 60 revs/min) are treated with 147 g of the condensation product. The reaction is carried out at 40° for a period of 4 hours. The cationic polyacrylamide product obtained can be precipitated by addition of acetone and used as the flocculation agent or the aqueous reaction solution, without isolation of the active product, can be used as the agent.

EXAMPLE 10

710 g of a 2.5% aqueous solution of polyacrylamide with a Brookfield viscosity of 2500 cp (spindle No. 4, 60 revs/min), 37.5 g of N-methyl-ethanolamine, 40.5 g of a 37% aqueous formaldehyde solution and 15.0 g of urea are reacted at 40°–45° over a period of 4 hours. The pH of the reaction solution is then adjusted to 9.5 by addition of 2.1 ml of 30% hydrochloric acid. The viscosity of the solution after reaction is 3300 cp, and after a storage time of 2 weeks at 50° C. it is 5300 cp.

EXAMPLE 11

The procedure of Example 10 is repeated using 710 g of a 2.5% aqueous solution of polyacrylamide with a Brookfield viscosity of 2500 cp (spindle No. 4, 60 revs/min), 56.25 g of N-methyl-ethanolamine, 60.75 g of a 37% aqueous formaldehyde solution and 15.0 g of urea. After reaction the pH of the reaction solution is adjusted to 9.5 by addition of 2.4 ml of 30% hydrochloric acid. Immediately after the reaction the viscosity of the solution is 3300 cp. and after a storage time of 2 weeks at 50° C. it is 4600 cp.

EXAMPLE 12

The procedure of Example 10 is repeated using 710 g of a 2.5% aqueous solution of polyacrylamide with a Brookfield viscosity of 2500 cp (spindle No. 4, 60 revs/min), 37.5 g of N-methyl-ethanolamine, 40.5 g of a 37% aqueous formaldehyde solution and 21.0 g of dicyandiamide. After reaction the pH of the reaction solution is adjusted to 9.5 by addition of 2.4 ml of 30% hydrochloric acid. Immediately after the reaction the viscosity of the solution is 3300 cp. and after a storage time of 2 weeks at 50° C. it is 5000 cp.

EXAMPLE 13

The procedure of Example 10 is repeated using 710 g of a 2.5% aqueous solution of polyacrylamide with a Brookfield viscosity of 2500 cp (spindle No. 4, 60 revs/min), 56.25 g of N-methyl-ethanolamine, 60.75 g of a 37% aqueous formaldehyde solution and 21.0 g of dicyandiamide. After reaction the pH of the reaction solution is adjusted to 9.5 by addition of 2.5 ml of 30% hydrochloric acid. Immediately after the reaction the viscosity of the solution is 3200 cp. and after a storage time of 2 weeks at 50° C. it is 4500 cp.

APPLICATION EXAMPLES

EXAMPLE A

A 2% aqueous paper stock solution was made up with the following solid constituents:
100 parts bleached sulphite cellulose
20 parts kaolin 3 parts resin size
2 parts aluminium sulphate The solutions as products described in Production Examples 1, 4, 5, 6 and 8 were diluted with water to give 0.05% aqueous solutions of such product solutions. To 5 and 10 ml quantities of these 0.05% aqueous solutions were added in each case 250 ml of the above-described 2% aqueous paper stock solution and 750 ml of water. Each solution was then stirred for 5 seconds at 250 revs/min and thereafter added to the filler chamber of a Rapid-Köthen paper machine in which 3 l water were already present. After a pause of 20 seconds the vacuum valve was activated and the paper sheet formation effected.

The formed paper sheet samples were dried and conditioned, and then burnt to ash and the ash content calculated. The ash content related to the amount of fillers employed and expressed as a percentage gives the % retention, the results being given in the following Table 1.

TABLE 1

| Example No. of Flocculation Agent | Amount of 0.05% Flocculation Agent Solution employed (ml) | % Concentration of Flocculation Agent related to dry weight of paper | % Ash | % Retention |
| --- | --- | --- | --- | --- |
| 1 | 5 | 0.05 | 12.30 | 73.8 |
|   | 10 | 0.1 | 12.96 | 77.7 |
| 4 | 5 | 0.05 | 12.61 | 75.6 |
|   | 10 | 0.1 | 13.45 | 80.7 |
| 5 | 5 | 0.05 | 11.57 | 69.4 |
|   | 10 | 0.1 | 13.31 | 79.8 |
| 6 | 5 | 0.05 | 11.19 | 67.1 |
|   | 10 | 0.1 | 12.12 | 72.7 |
| 8 | 5 | 0.05 | 12.15 | 72.9 |
|   | 10 | 0.1 | 13.50 | 81.0 |
| (without) | — | — | 9.67 | 58.0 |

EXAMPLE B

A 1% aqueous paper stock solution was made up with the following solid constituents:
100 parts bleached sulphite cellulose
20 parts calcium carbonate Four 250 ml quantities of the 1% aqueous paper stock solution were mixed with a commercial synthetic size emulsion (an emulsion of a dimeric alkylketene*), the weight of emulsion used being 1% of the weight of the bleached sulphite cellulose. To 5, 7.5, 10 and 15 ml quantities of a 0.025% aqueous solution of the flocculation agent solution produced as described in Production Example 3 were added in each case one of the four quantities of the above-described sized paper stock solution and 750 ml water. Each solution was then stirred and used in the Rapid-Köthen paper machine as described in Example A. The data were obtained similarly and the results are given in the following Table 2.
*trade name AQUAPEL of Hercules G.m.b.H.

TABLE 2

| Example No. of Flocculation Agent | Amount of 0.05% Flocculation Agent solution employed (ml) | % Concentration Flocculation Agent related to dry weight of paper | % Ash |
| --- | --- | --- | --- |
| 3 | 5 | 0.05 | 6.41 |
|   | 7.5 | 0.075 | 7.74 |
|   | 10 | 0.10 | 9.26 |
|   | 15 | 0.15 | 9.58 |
| (without) | — | — | 4.23 |

EXAMPLE C

A 1.2% aqueous paper stock solution was made up with the following solid constituents:
70 parts groundwood
30 parts bleached sulphite cellulose
20 parts kaolin
2 parts aluminium sulphate Using this paper stock solution and various quantities of a 0.05% aqueous solution of the flocculation agent solution produced as described in Production Example 2, the procedure described in Example A was effected. The results obtained are given in the following Table 3.

TABLE 3

| Example No. of Flocculation Agent | Amount of 0.05% Flocculation Agent solution employed (ml) | % Concentration Flocculation Agent related to dry weight of paper | % Ash | % Retention |
| --- | --- | --- | --- | --- |
| 2 | 3 | 0.05 | 14.47 | 86.8 |
|   | 6 | 0.10 | 15.04 | 90.2 |
|   | 12 | 0.20 | 15.56 | 93.3 |
|   | 18 | 0.30 | 15.47 | 92.8 |
| (without) | — | — | 12.89 | 77.3 |

EXAMPLE D

A 2% aqueous cellulose suspension was made up with the following solid constituents:
70 parts groundwood
30 parts bleached sulphite cellulose
15 parts kaolin
2 parts aluminium sulphate The flocculation agent solution produced as described in Production Example 2 was diluted with water to give a 0.05% aqueous solution of this solution. To 2.5, 5, 10 and 15 ml quantities of the 0.05% aqueous solution were added in each case 125 ml of the above-described 2% aqueous cellulose suspension and 875 ml water, and the mixture was dewatered in the Schopper-Riegler apparatus about 20 seconds after the admixture. As a measure of the effectiveness as a flocculation agent the time taken for a certain quality of filtrate to be collected from the suspension was measured, this test method being described in the instruction pamphlet V 17/61 of the "Verein der Zellstoff und Papier-Chemiker und -Ingenieure". The results are given in the following Table 4:

TABLE 4

| Example No. of Flocculation Agent | Amount of 0.05% Flocculation Agent solution employed (ml) | % Concentration Flocculation Agent related to dry weight of paper | Dewatering time (seconds) |
| --- | --- | --- | --- |
| 2 | 0 | — | 72.3 |
|  | 2.5 | 0.05 | 61.5 |
|  | 5 | 0.1 | 55.8 |
|  | 10 | 0.2 | 49.6 |
|  | 15 | 0.3 | 44.9 |

EXAMPLE E

A 2% aqueous paper stock solution was made up with the following solid constituents:
100 parts bleached sulphite cellulose
20 parts kaolin
3 parts resin size
2 parts aluminium sulphate The solutions as products described in Production Examples 10 to 13 were diluted with water to give 0.05% aqueous solutions of such product solutions. 5 and 10 ml quantities of these 0.05% aqueous solutions were added in each case to 250 ml of the above-described 2% aqueous paper stock solution and 750 ml of water. Each solution was then stirred for 5 seconds at 250 revs/min and thereafter added to the filler chamber of a Rapid-Köthen paper machine in which 3 l water were already present. After a pause of 20 seconds the vacuum valve was activated and the paper sheet formation effected.

The formed paper sheet samples were dried and conditioned, and then burnt to ash and the ash content calculated. The ash content related to the amount of fillers employed and expressed as a percentage gives the % retention, the results being given in the following Table 5. The % ash and % retention values are average values from two determinations and are uncorrected.

| Example No. of Flocculation Agent | | Amount of 0.05% Flocculation Agent Solution employed (ml) | % Concentration of Flocculation Agent related to dry weight of paper | % Ash | % Retention |
| --- | --- | --- | --- | --- | --- |
| 10 | not stored | 5 | 0.05 | 12.77 | 76.6 |
|  |  | 10 | 0.1 | 13.68 | 82.1 |
|  | after two weeks storage at 50° C. | 5 | 0.05 | 12.91 | 77.5 |
|  |  | 10 | 0.1 | 13.61 | 81.7 |
| 11 | not stored | 5 | 0.05 | 12.60 | 75.6 |
|  |  | 10 | 0.1 | 13.60 | 81.6 |
|  | after two weeks storage at 50° C. | 5 | 0.05 | 12.74 | 76.4 |
|  |  | 10 | 0.1 | 13.50 | 81.0 |
| 12 | not stored | 5 | 0.05 | 12.41 | 74.5 |
|  |  | 10 | 0.1 | 13.26 | 79.6 |
|  | after two weeks storage at 50° C. | 5 | 0.05 | 12.83 | 76.9 |
|  |  | 10 | 0.1 | 13.51 | 81.1 |
| 13 | not stored | 5 | 0.05 | 12.74 | 76.4 |
|  |  | 10 | 0.1 | 13.78 | 82.7 |
|  | after two weeks storage at 50° C. | 5 | 0.05 | 12.86 | 77.2 |
|  |  | 10 | 0.1 | 13.48 | 80.9 |
|  | (without) | — | — | 10.69 | 64.1 |

What is claimed is:

1. The product of the reaction between:
   (a) a polymerisate of acrylamide and/or methacrylamide and optionally of one or more further types of polymerisable ethylenic-unsaturated monomers, the acrylamide and/or methacrylamide monomers constituting at least 5 molar percent of any prepolymerisation mixture of such monomers and further types of ethylenic-unsaturated monomers,
   (b) formaldehyde,
   (c) a secondary amine of formula I,

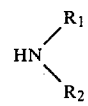

wherein each of $R_1$ and $R_2$, independently, is $(C_{1-6})$alkyl, $(C_{3-6})$alkenyl, $(C_{2-4})$hydroxyalkyl or cyclohexyl, or $R_1$ and $R_2$ together constitute 1,5-pentamethylene, 1,4-tetramethylene, or 1,4-tetramethylene interrupted by O, S or N-$(C_{1-4})$alkyl, and
   (d) a functional derivative of an acid having stabilizing properties against further crosslinking and/or polymerisation of the reaction product and containing in the functional radical at least one NH group capable of entering into equilibrium reaction with formaldehyde under the reaction conditions used,
under neutral or basic conditions and in the molar ratio of reagents (b):(c):(d) per mol of carbamoyl group in reagent (a) of x:y:z, wherein y is 0.1 to 3, x is 0.1 to (y+1), and z is greater than zero, which end reaction product is in free base, acid addition salt or quaternary ammonium salt form.

2. A product according to claim 1, which is the product of the reaction between:
   (a') a homopolymerisate of acrylamide or of methacrylamide, or a water-soluble or -dispersible copolymerisate of acrylamide or of methacrylamide and of one or more further types of polymerisable ethylenic-unsaturated monomers, the acrylamide or methacrylamide monomers constituting at least 5 molar percent of any pre-polymerisation mixture of such monomers and further types of ethylenic-unsaturated monomers, and the homopolymerisate or copolymerisate chains being derived from 14,000 to 140,000 monomeric units,
   (b') formaldehyde, and
   (c') the reaction product of urea, formaldehyde and a secondary amine of formula I",

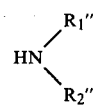

wherein each of $R_1''$ and $R_2''$, independently, is methyl, ethyl or 2-hydroxyethyl, or $R_1''$ and $R_2''$, together with the attached NH< group, constitute morpholine, in the molar ratio of urea:formaldehyde:secondary amine of 1:1:1, which reaction product is in free base, acid addition salt or quaternary ammonium salt form, under neutral or basic conditions and in the molar ratio of mols carbamoyl groups in reagent (a'): mols of reagent (b') per mol of reagent (c') of 1:1, which end reaction product is in free base, acid addition salt or quaternary ammonium salt form.

3. A product according to claim 1, which is the product of the reaction between:

(a'') a polymerisate of acrylamide and/or methacrylamide and optionally one or more further types of polymerisable ethylenic-unsaturated monomers, the acrylamide and/or methacrylamide monomers constituting at least 5 molar percent of any prepolymerisation mixture of such monomers and further types of ethylenic-unsaturated monomers, (b'') formaldehyde, (c'') a secondary amine of formula I,

wherein each of $R_1$ and $R_2$, independently, is $(C_{1-6})$alkyl, $(C_{3-6})$alkenyl, $(C_{2-4})$hydroxyalkyl or cyclohexyl, or $R_1$ and $R_2$ together constitute 1,5-pentamethylene, 1,4-tetramethylene, or 1,4-tetramethylene interrupted by O, S or N-$(C_{1-4})$alkyl, and (d'') a functional derivative of an acid having stabilizing properties against further polymerisation of (a'') and containing in the functional radical at least one NH group capable of entering into equilibrium reaction with formaldehyde under the reaction conditions used, under basic conditions and in the molar ratio of reagents (b''):(c''):(d'') per mol of carbamoyl group in reagent (a'') of x''':y''':z''', wherein x''' is 0.1 to 1, y''' is 0.1 to 2 and z''', when x''' is greater than y''', is greater than or equal to (x'''−y''')/n, or z''', when x''' is less than or equal to y''', is greater than or equal to 10% of x''', n being the number of hydrogen atoms bound to the nitrogen atoms per molecule of the reagent (d'') which are capable of entering into equilibrium reaction with formaldehyde under the reaction conditions used, with the proviso that y'''/x''' ≧ 0.5, which end reaction product is in free base or quaternary ammonium salt form.

4. A product according to claim 1, in which z is equal to or greater than $[2x−(y+1)]/n$ when $[2x−(y+1)]/n$ is a positive quantity, n being the number of hydrogen atoms bound to the nitrogen atoms per molecule of the reagent (d) which are capable of entering into equilibrium reaction with formaldehyde under the reaction conditions used.

5. A product according to claim 1, wherein the further polymerisable ethylenic-unsaturated monomers are selected from ethylene, propylene, butylene, isobutylene, styrene, acrylonitrile, methacrylonitrile, acrylic acid, methacrylic acid, maleic acid, crotonic acid, vinyl ethers, and protonatable or quaternisable, and protonated or quaternised ethylenic-unsaturated monomers which, in basic form, contain one or more tertiary amino groups.

6. A product according to claim 5, wherein the further polymerisable ethylenic-unsaturated monomers are selected from protonatable or quaternisable, or protonated or quaternised ethylenic-unsaturated monomers which, in basic form, contain one or more tertiary amino groups.

7. A product according to claim 6, wherein the further polymerisable ethylenic-unsaturated monomers are selected from the following types (A), (B) and (C):

(A) $(C_{2-4})$Alkenyl-substituted pyridines further unsubstituted or substituted on the heterocyclic ring with a $(C_{1-2})$alkyl radical or with a methyl radical and a $(C_{1-2})$alkyl radical, in free base, acid addition salt of quaternary ammonium salt form, (B) Compounds of formula B,

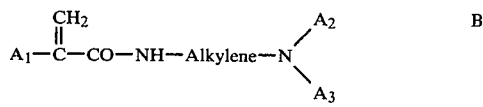

wherein
$A_1$ is hydrogen or methyl,
$A_2$ is $(C_{1-6})$alkyl or cyclohexyl,
$A_3$ is $(C_{1-6})$alkyl, and
Alkylene is straight or branched chain $(C_{2-4})$alkylene, in free base, acid addition salt or quaternary ammonium salt form, and (C) Compounds of formula $C^1$ or $C^2$,

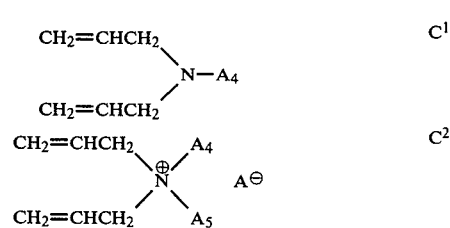

wherein
$A_4$ is $(C_{1-6})$alkyl, and
$A_5$ is $(C_{1-6})$alkyl,
or, for formula $C^2$, $A_4$ and $A_5$, alternatively, together constitute 1,4-tetramethylene or 1,5-pentamethylene, and $A^\ominus$ is an anion,
the compounds of formula $C^1$ being in free base or acid addition salt form.

8. A product according to claim 1, wherein the molar percent of acrylamide and/or methacrylamide monomers in a mixture of acrylamide and/or methacrylamide monomers with one or more further types of polymerisable ethylenic-unsaturated monomers is at least 50 molar percent.

9. A product according to claim 1, wherein the polymerisate (a) possesses a water-solubility at room temperature of at least 1%.

10. A product according to claim 1, wherein the polymerisate (a) consists of a homopolymerisate or copolymerisate from acrylamide and/or methacrylamide.

11. A product according to claim 1, wherein the polymeric chains in the polymerisate (a) are derived from 7,000 to 140,000 monomeric units.

12. A product according to claim 11, wherein the polymeric chains in the polymerisate (a) have average molecular weights in the range 500,000 to 10,000,000.

13. A product according to claim 1, wherein the polymerisate (a) is reacted further with the reagents (b), (c) and (d) without first being isolated from the aqueous medium in which it has been produced.

14. A product according to claim 1, wherein the polymerisate (a) is produced by polymerisation in the presence of a copolymerisable cross-linking agent with at least two unsaturated ethylenic groups per molecule.

15. A product according to claim 1, wherein the reagent (c) is a compound of formula I',

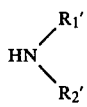            I' wherein
each of $R_1'$ and $R_2'$, independently, is $(C_{1-2})$alkyl, allyl, 2-hydroxyethyl or cyclohexyl, or
$R_1'$ and $R_2'$, together with the attached HN< group, constitute morpholine, pyrrolidine, piperidine or N-methylpiperazine.

16. A product according to claim 1, wherein the reagent (d) contains, apart from one or more functional derivatives of an acid group containing one or more NH groups, no further substituents which react with formaldehyde, secondary amines and carbamoyl group-containing polymerisates.

17. A product according to claim 1, wherein the functional derivatives of an acid group in the reagent (d) is selected from the radicals

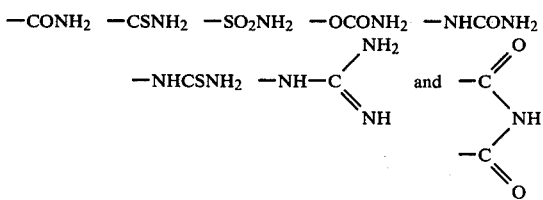

18. A product according to claim 16, wherein the reagent of formula (d) is a compound of formula II, III, IV or V, $R_6—X_1$            II wherein
$R_6$ is hydrogen or $(C_{1-6})$alkyl, and
$X_1$ is —CONH$_2$, —CSNH$_2$, —NHCONH$_2$, —NHCSNH$_2$

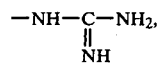

the compound wherein $X_1$ is

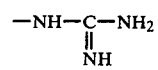

being in free base or acid addition salt form, $R_7—X_2$            III wherein
$R_7$ is $(C_{1-6})$alkyl, phenyl or methylphenyl, and
$X_2$ is —SO$_2$NH$_2$ or —OCONH$_2$,

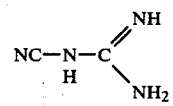            IV $R_8—CO—NH—CO—R_9$            V wherein each of $R_8$ and $R_9$ is —NH$_2$, or $R_8$ and $R_9$ together constitute a $(C_{2-4})$alkylene or $(C_{2-4})$alkylidene bridging group or a phenylene-1,2 group.

19. A product according to claim 4, wherein n is 1 to 4.

20. A product according to claim 4, wherein x is $\leq 2y$, y is 0.1 to 2, and z is at least 10% of x.

21. A product according to claim 20, wherein x is y/2 to y.

22. A product according to claim 20, wherein y is 0.5 to 1.5.

23. A product according to claim 20, wherein z is at least 0.5.

24. A product according to claim 23, wherein z is less than or equal to 10.

25. A product according to claim 1, wherein y is 2 to 3, x is $(1\pm0.2)y$, z is 0.5 to 1.5 and the number of hydrogen atoms bound to the nitrogen atoms per molecule of the reagent (d) which are capable of entering into equilibrium reaction with formaldehyde under the reaction conditions used, n, is 2 to 4.

26. A product according to claim 25, wherein z is equal to or greater than $[2x-(y+1)]/n$ when this has a value of at least 0.5.

27. A product according to claim 26, wherein y is 2 to 2.5, x is the same as y, and z is 0.8 to 1.2.

28. A product according to claim 4, produced by the reaction of
(a) polyacrylamide
(b) formaldehyde
(c) N-methylethanolamine and
(d) dicyandiamide.

29. A product according to claim 28, in which the reagents (a), (b), (c) and (d) are reacted together in the molar ratio of reagents (b):(c):(d) per mol of carbamoyl group in reagent (a) of 1:1:1.

30. A product according to claim 25, produced by the reaction of
(a) polyacrylamide
(b) formaldehyde
(c) N-methylethanolamine and (d) urea.

31. A product according to claim 30, in which the reagents (a), (b), (c) and (d) are reacted together in the molar ratio of reagents (b):(c):(d) per mol of carbamoyl group in reagent (a) of 2:2:1.

32. A product according to claim 30, in which the reagents (a), (b), (c) and (d) are reacted together in the molar ratio of reagents (b):(c):(d) per mol of carbamoyl group in reagent (a) of 3:3:1.

33. A process for producing a polyamideamine in free base, acid addition salt or quaternary ammonium salt form comprising reacting together the reagents (a), (b), (c) and (d) under the conditions and in the molar ratio as defined in claim 1, and, when required, interconverting free base and acid addition salt forms and/or quaternising the free base form of the polyamideamine to obtain the quaternary ammonium salt form thereof.

34. A process according to claim 33, in which x is less than 2 and the reagents (a), (b), (c) and (d) are reacted simultaneously.

35. A process according to claim 33, wherein the reagents (a), (b), (c) and (d) are reacted simultaneously and the pH of the reaction medium is between 8 and 12.

36. A process according to claim 33, wherein the reaction is conducted between room temperature and 90° C.

37. A process according to claim 33, wherein x is between 2 and 4, the number of hydrogen atoms bound to the nitrogen atoms per molecule of the reagent (d) which are capable of entering into equilibrium reaction with formaldehyde under the reaction conditions used, n, is at least 2, and the reaction is effected in a stepwise manner by which the reagents (b), (c) and (d) are intially reacted together in a stepwise manner to form an insolable product, and the latter is subsequently reacted with reagent (a).

38. A process according to claim 37, wherein the reagent (d) is reacted with reagents (b) and (c) in a molar ratio $1:q$ to $(p+q-1):q$, respectively, and the intermediate produced is then reacted with a further amount of reagent (b) equivalent to (1 to p) times the molar amount of reagent (d) used, p and q, independently, being 1 to $(n-1)$.

39. A process according to claim 37, wherein the reagent (d) is reacted with the equimolar reaction product of reagent (c) with reagent (b) in a molar ratio of $1:q$, respectively, and the intermediate produced is then reacted with a further amount of reagent (b) equivalent to p times the molar amount of reagent (d) used, p and q, independently, being 1 to $(n-1)$.

40. An aqueous solution or dispersion of a product according to claim 1.

41. An aqueous solution or dispersion of the product according to claim 1 which contains 0.001 to 100 mg. of said product per liter.

* * * * *